United States Patent [19]
Lindsey

[11] Patent Number: 6,041,863
[45] Date of Patent: *Mar. 28, 2000

[54] METHOD OF PASSIVE REMEDIATION OF D.N.A.P.L.'S FROM GROUNDWATER REMEDIATION WELLS

[76] Inventor: William B. Lindsey, 3811 E. Stanford, Springfield, Mo. 65809

[*] Notice: This patent is subject to a terminal disclaimer.

[21] Appl. No.: 09/090,801

[22] Filed: Jun. 4, 1998

Related U.S. Application Data

[60] Provisional application No. 60/048,652, Jun. 5, 1997.

[51] Int. Cl.[7] .............................. E21B 21/00; B09B 1/00
[52] U.S. Cl. ..................... 166/311; 166/187; 166/369; 405/52; 405/128; 210/747
[58] Field of Search .................... 166/187, 265, 166/270, 272, 311, 369; 405/52, 128; 210/692, 693, 747, 908

[56] References Cited

U.S. PATENT DOCUMENTS

| | | | |
|---|---|---|---|
| 3,617,551 | 11/1971 | Johnston | 210/136 X |
| 3,774,685 | 11/1973 | Rhodes | 166/314 |
| 3,901,320 | 8/1975 | Calderon et al. | 166/311 |
| 4,040,486 | 8/1977 | Kirkland, Jr. | 166/311 |
| 5,080,781 | 1/1992 | Evins, IV | 210/112 |
| 5,083,053 | 1/1992 | Bernhardt | 166/369 X |
| 5,143,015 | 9/1992 | Lubitz et al. | 166/187 |
| 5,252,000 | 10/1993 | Mohs | 405/53 |
| 5,366,019 | 11/1994 | Brooks | 166/387 |
| 5,492,838 | 2/1996 | Pawliszyn | 210/175 X |
| 5,613,555 | 3/1997 | Sorem et al. | 166/187 |
| 5,645,374 | 7/1997 | Lesage et al. | 405/128 |

Primary Examiner—Eileen Dunn Lillis
Assistant Examiner—Jong-Suk Lee
Attorney, Agent, or Firm—Jonathan A. Bay

[57] ABSTRACT

A passive absorptive device covered with a layer of DNAPL-philic hydrophobic material, is disposed within a groundwater remediation well to soak up DNAPL (ie., dense non-aqueous phase liquid) seepage at the wall of the groundwater remediation well so that, after retrieval of the passive absorptive device from the well, the DNAPL soaked in the DNAPL-philic hydrophobic layer can be safely disposed of.

20 Claims, 5 Drawing Sheets

METHOD OF PASSIVE REMEDIATION OF D.N.A.P.L.'S FROM GROUNDWATER REMEDIATION WELLS

CROSS-REFERENCE TO PROVISIONAL APPLICATION(S)

This application claims the benefit of U.S. Provisional Application Ser. No. 60/048,652, filed Jun. 5, 1997.

BACKGROUND AND SUMMARY OF THE INVENTION

The invention generally relates to a method of groundwater remediation and more particularly to passive remediation of DNAPL's (ie., dense non-aqueous phase liquids) from groundwater remediation wells.

Chlorinated solvents have been used widely in industry in the past, and their disposal has been historically abused. For instance, cast out in lagoons and the like, chlorinated solvents have leeched into the soil to become common contaminants in groundwater. Chlorinated solvents are included in a family widely known as dense non-aqueous phase liquids, which is commonly abbreviated to the acronym "DNAPL's". Common chlorinated solvents frequently detected as DNAPL's in groundwater include trichloroethylene (TCE), tetrachloroethylene (PCE), and 1,1,1-trichloroethane (TCA).

DNAPL's are characterized by specific gravities higher than water but viscosities lower than water. They are generally insoluble in as well as generally immiscible with water. Since DNAPL's are heavier than water, they tend to sink through the groundwater layer to the lowest level of the water bearing unit. Although DNAPL's are generally immiscible with groundwater, the solubilities of most DNAPL's in groundwater exceeds drinking water standards.

The EPA has recognized that the cleanup of DNAPL contaminated groundwater may be difficult if not impossible. As DNAPL's are heavier than water, they sink downward through our aquifers in vertical stringers, displacing water, filling pore spaces, and coming to rest in depressions in impervious layers and the like. Also, inclined bedding planes of sedimentary rock or other kinds of sub-surface heterogeneity can cause lateral spreading of the DNAPL contaminant to reach across a wide area. The standard treatment technology of "pump and treat" from remediation wells does not often work effectively. Remote pockets or pores filled with DNAPL's dissolve at a snail's pace as nearby remediation wells persistently draw up what little DNAPL seeps into the well. These residual pockets of DNAPL can act as a source of ground water contamination for many years, in fact in some cases, studies find that remediation by "pump and treat" methods would take decades or longer. Whereas studies have found that the theoretical time required for restoring DNAPL-contaminated aquifers contained in sand and/or silt deposits resting on shales, siltstones, or sandstones might be achieved in weeks:—the same studies have also found that to achieve like results in limestone and/or dolomite bedrock layers would take up to several years. Accordingly, the EPA has recently updated guidance documents which recognize that restoration of DNAPL-contaminated aquifers to Maximum Contaminated Limits (M.C.L.'s) may not be practicable everywhere.

Indeed, wherever restoration of a DNAPL-contaminated aquifer has been successfully achieved, it has been at a site where geologic conditions were especially favorable. For instance, at a site in New Jersey, DNAPL's were pooled in unconsolidated sand and silt materials on top of a clay surface. A series of recovery or remediation wells, drilled down to the pool, were able to extract by "pump and treat" technology 94% of the pooled DNAPL. See, eg., A. Michalski et al., "A Field Study of Enhanced Recovery of DNAPL Pooled Below the Water Table," *GWMR,* 90–100, Winter 1995. At Hill Air Force Base in Utah, a "pump and treat" process combined with surfactant flooding successfully recovered more than 23,000 gallons of DNAPL from two pools. There, the two pools were located in depressions of an impervious surface. See, eg., Oolman et al., "DNAPL Flow Behavior in a Contaminated Aquifer: Evaluation of Field Data," *GWMR,* 125–37, Fall 1995.

These successful DNAPL clean ups, as well as other instances reported to date, enjoyed favorable geologic conditions for removal of DNAPL's. The favorable geologic conditions included permeable unconsolidated materials underlain by an impervious layer, and that the DNAPL's were found pooled within depressions or pockets in the impervious layer. In above-mentioned reports it was also noted, however, that it was not generally possible to speed-up the recovery of residual DNAPL by increasing pumping rates. In other words, the stuff is molasses thick and dissolves only but very slowly.

Even where geologic conditions are favorable, the sinking of remediation wells and flooding thereof with surfactants also risks worsening the DNAPL contamination and spreading its extent. For instance, the drilling of monitoring and/or remediation wells through DNAPL-contaminated aquifers risks creating new artificial vertical pathways through impervious layers and hence allow additional downward sinking of the DNAPL into deeper zones of the aquifer. And to worsen a situation gone bad, the use of surfactants where vertical pathways are undefined or uncontrolled, particularly where low permeability layers had stopped the DNAPL, could result in solvent-aided penetration of the DNAPL down through the low permeability layer.

Experience with a site in Southwest Missouri has provided the incentive look for solutions to DNAPL clean up beyond the standard "pump and treat" practices of the prior art.

In particular, this site is located in bedrock comprising layers of limestone (a rock whose major constituent is the mineral calcite, eg., $CaCO_3$) and dolomite ("dolomite" being both a rock and a mineral, the rock's major constituents being both calcite and the mineral dolomite, eg., $CaMg(CO_3)$). More significantly, this bedrock of limestone and dolomite and the like contained classic karst solution features. The experience with a "pump and treat" process was as follows. Only fractional amounts of the estimated DNAPL load were recoverable, and at slow rates. Most of the DNAPL that could be recovered from an original well was recovered during the first 2 years of an 8-year recovery period. However, it was possible to extract a trickle of DNAPL for the remaining 6 years, with no indication at the end of the 8-year recovery that the trickle of DNAPL would not persist indefinitely. It became a practice to drill new wells adjacent to the original wells after the original wells effectively went to being non-producing after 2 years. In some cases there seemed to be local relief of the trickle condition and DNAPL could be drawn out of the new well at enhanced rates. However, wherever this was successful with a new well adjacent an original well, DNAPL recovery dropped off much sharper than had occurred with an original well, in fact the drop off occurred substantially within a period of weeks to months.

Studies were conducted to find what problems may be existing. Downhole video inspection disclosed the following matters of DNAPL's transport phenomena. DNAPL's seeped in to the wells at several elevations, generally at the bedding planes between the bedrock layers in which there might be several feet of stratigraphic intervals between deeper bedrock layers. In at least one instance, a DNAPL string appeared to seep in at one level, sink down in the well hole, and migrate out of the well at another lower bedding plane. Hence a pump at the bottom of the well had no chance to draw in that DNAPL string.

Another finding of the study is as follows, although its telling requires use of relatively difficult, technical language. By way of background, any given DNAPL composition typically includes both dense and light, insoluble and moderately soluble, volatile and non-volatile liquid and solid chemical components. Bench studies show that exposing a DNAPL to fresh water results in dissolution of the more soluble/volatile chemical phases. Likewise, in a well hole, exposing a DNAPL to large quantities of groundwater in the open well hole results in dissolution of more soluble/volatile chemical phases. As a result, this increases the DNAPL's viscosity, interfacial tension, and density. In some cases, the effect of these changes on the DNAPL entering the well hole appears to cause a "clotting" action. Put differently, the DNAPL "freezes" up the pores that previously had conducted the DNAPL into the well hole. The DNAPL thus clots the pores and backs up behind the clots at the bedrock pore/water interface. DNAPL entry at that pore and multiple others where clotting takes place, is no longer effectively possible.

Another finding of the study was much more basic. It was suspected that the majority of the DNAPL would be pooled within solution cavities in the upper bedrock zone. The experience of the drillers was substantially different. Very few DNAPL-contaminated solution cavities were encountered despite in some areas high-intensity drilling. However, in karst solution features where solution cavities are amply abundant, this experience could be explained as an example of "they are hard to hit" (eg., the "they" being DNAPL-contaminated solution cavities as opposed to the general population of solution cavities).

It became evident that a different approach would be needed for cleaning up DNAPL contamination in this limestone/dolomite bedrock containing karst solution features. What is needed is an improvement which overcomes the shortcomings of the prior art when applied to a bedrock geology having karst solution features. A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
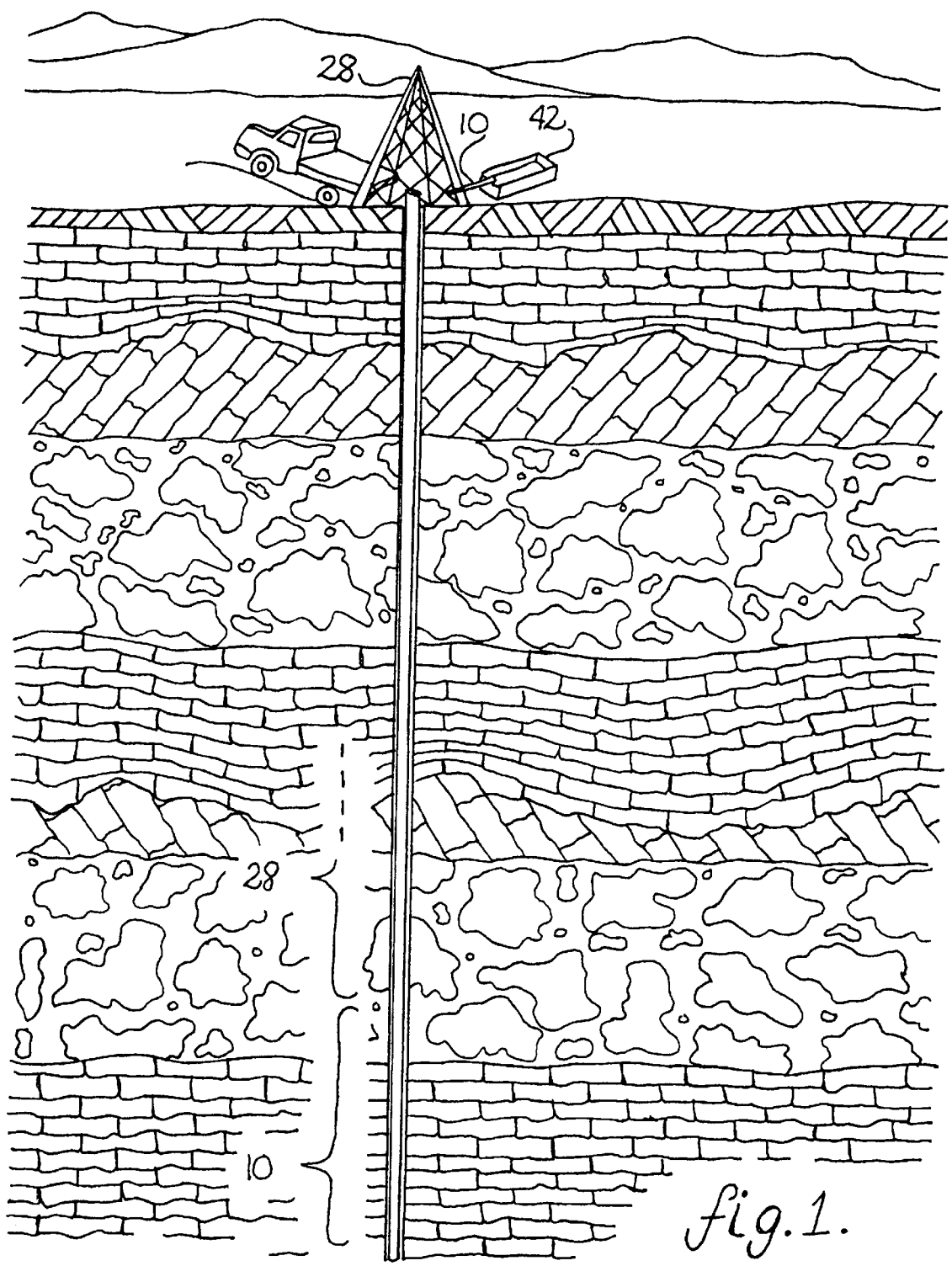
FIG. 1 is a perspective view showing work-in-progress of passive remediation of DNAPL's in accordance with the invention, transpiring at a groundwater remediation well-site, wherein the well hole through rock strata is shown for illustrative purposes.

FIG. 1 is a perspective view showing work-in-progress at a groundwater remediation well-site, where passive remediation of DNAPL's in accordance with the invention is being practiced.

The rock strata shown for this well site is typical of the Ozark plateau in the Midwest, which encompasses Southwest Missouri. The Ozark region is characterized by bedrock containing karst solution features. The bedrock typically is composed of multiple stratified layers of rock of sedimentary origin. The rock types predominantly comprise dolomite rock, limestone, dolomitic limestone, limey dolomite (eg., various degrees of intergrade between dolomite and limestone), as well as to a lesser extent some layers of sandstone and shale and so on. Intrusions of a much later origin appear in non-stratified formations. The bedrock is capped at the surface by a residuum of chert or flint (ie., silicate rocks) and shallow soils. The bedrock layers are highly fractured due to the region's eon's long history of alternating uplift (resulting in long vanished plateaus) and subsidence (in which the Mississippi Valley was often a large inland sea). The dissolving action of groundwater has enlarged these fractures and interspaces to form a vast network of subsurface drainage. In fact, over long lapses of history, some of these fractures have been opened up to the extent that they form the largest cave systems in this nation.

The dolomite and limestone are largely impervious to migration of DNAPL's. However, the abundant vertical fractures between bedding planes as well as horizontal interspaces between adjacent planes collectively give the DNAPL compositions access to substantially the whole network of the groundwater drainage. Additionally, there are virtually infinite cavities and pockets in which DNAPL's can come to rest.

As previously mentioned, video recordation of DNAPL migration in an actual well hole through this kind of rock finds the following anomalies.

Typically a DNAPL stringer enters the well hole where the well hole intersects a crack or pore that provides a pathway for the DNAPL composition. In some instances, a DNAPL stringer entering the well hole at a relatively higher elevation exits through a bedding plane at a relatively lower elevation. That way, the DNAPL stringer never reaches the bottom of the well hole. The standard method of "pump and treat" is doomed to failure in this instance because a submersible pump resting at the bottom of the well hole never has a chance to pump to the surface that particular stringer of DNAPL. In fact, the well hole may exacerbate the problem of DNAPL contamination by connecting the DNAPL stringer to a deeper layer of the bedrock that it previously did not have access to.

Also, wherever a DNAPL stringer seeps in through pores, it is exposed to a well hole filled with substantially fresher water than its immediate surroundings in the pore. Hence at the pore orifice in the well hole, the DNAPL undergoes a change in properties wherein some fractional amount of its volatile and/or soluble components locally dissolve such that the residue composition "clots" or "freezes" solid the pore orifice, thereby damming up any further recovery of DNAPL from that pore orifice.

FIGS. 2 through 7 show a passive absorptive device 10 in accordance with the invention, to address and overcome these problems of DNAPL recovery in a well hole drilled through karst geology as shown by FIG. 1.

Figure 2:
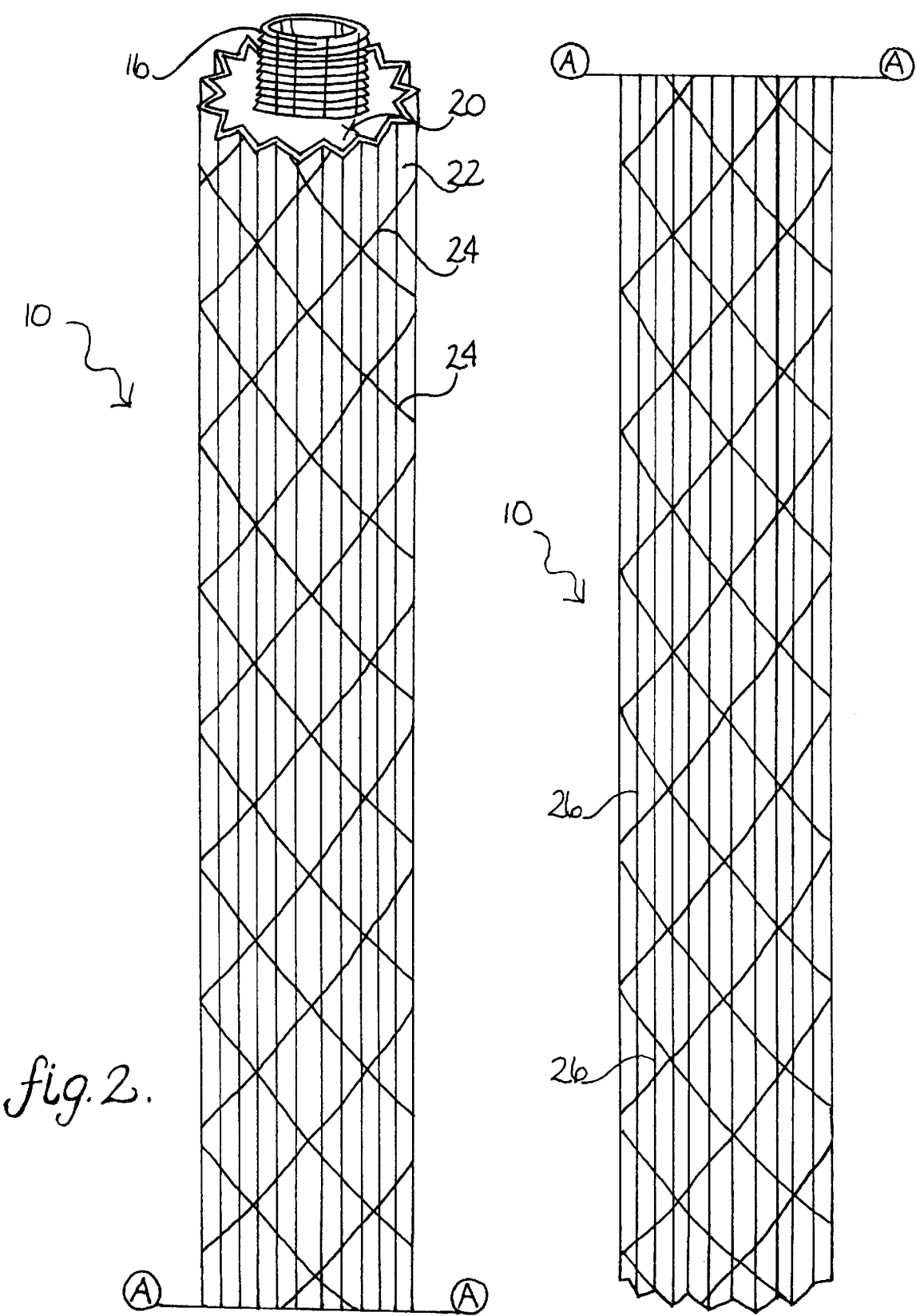
FIG. 2 is an enlarged scale perspective view of a passive absorptive device in accordance with the invention.
Figure 5:
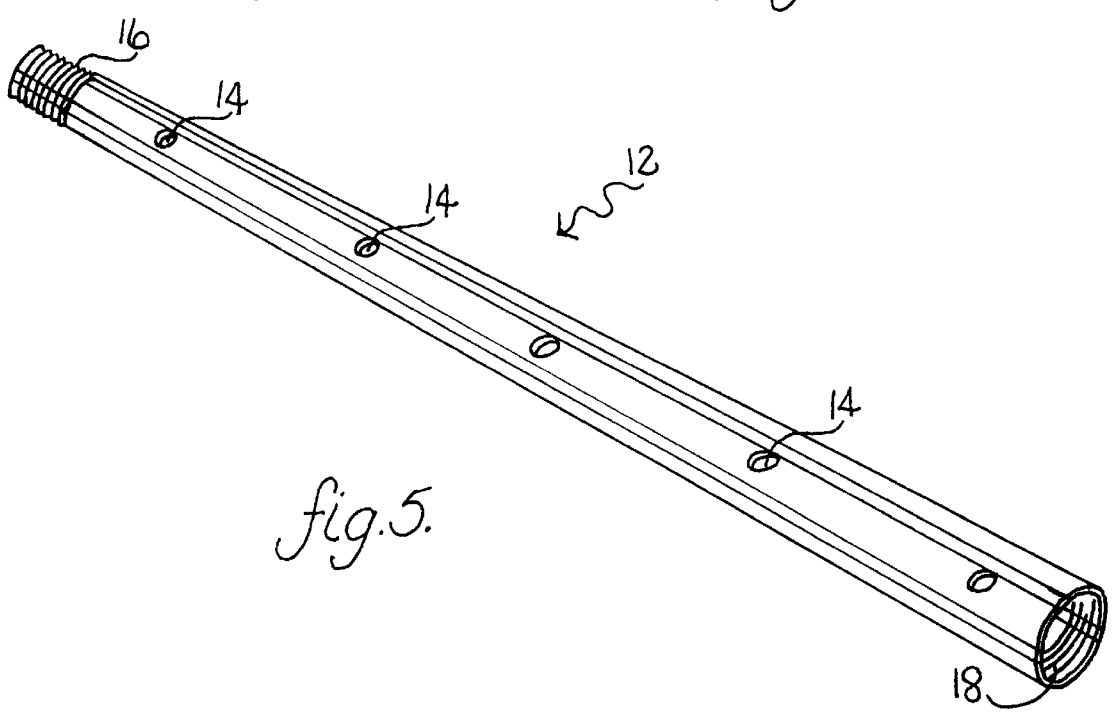
FIG. 5 is reduced scale perspective view of the tube core of the FIG. 2 passive absorptive device.

FIG. 2 is shows a completed assembly of the passive absorptive device 10. It comprises a tube core 12, preferably of PVC tube formed with perforations 14 (see, eg., FIG. 5) has its opposite end formed with internal and external pipe thread 16 and 18, respectively, as shown by FIG. 5 (in which view the tube core 12 is shown in isolation). The pipe thread ends 16 and 18 allow the tube 12 to couple together with other like tubes to form an endless train of such tubes (this is not shown). In one preferred embodiment, the tube 12 may measure about ten feet long (3 m) and about four-inches (10 cm) in diameter, for use prospectively in a well hole of about eight-inches (20 cm) in diameter. To return to FIG. 2, the tube core 12 is substantially surrounded by an inflatable bladder 20 fabricated from a suitable resilient material whose integrity can survive long exposure to the solvent attack of the given DNAPL composition. The bladder 20 is mounted for inflation on the tube core 12 much like a tire inner tube encircles a wheel rim. The bladder 20 preferably is permanently bonded to the tube core 12.

The outside wall of the bladder 12 is covered by a sleeve 22 of DNAPL-philic hydrophobic material. The chosen material ought to be substantially hydrophobic (eg., not absorbent to water) yet preferentially absorb the DNAPL composition. Laboratory trials have shown that a favorable candidate material—which is preferentially "DNAPL-philic and hydrophobic"—is polypropylene batting or the like. Polypropylene derives from a family of synthetic fibers known as polyolefines. This family of fibers typically exhibit very low retention of water yet preferentially absorb various hydrocarbons. Candidate commercial products and sources include PIGSKIMMER PULP™ from the New Pig Corporation;—TRANSPOR DRI FIBRE™ from the d.v. Talbott Company;—SXT OIL ONLY SOCK™ from Sorbent Products Co., Inc.;—MATASORB™, SORB$_X$, and SORB$_{X2}$ from Matarah Industries, Inc.;—and the polypropylene products of 3M Sorbents division of 3M, Inc.

The DNAPL-philic hydrophobic material is preferably used in a batting form, as indicated as 22 in the drawings. The batting is configured in a sleeve-like wrap or tubular "sock" 22 to cover the inflatable bladder 20. Preferably the batting 22 sewn to an inner mat 26 by means of quilting 24 or the like. It is the inner mat 26 which is bonded directly to the inflatable bladder 20. FIG. 2 shows the quilting 24 as it appears on the outside of the DNAPL-philic hydrophobic batting 22.

Figure 3:
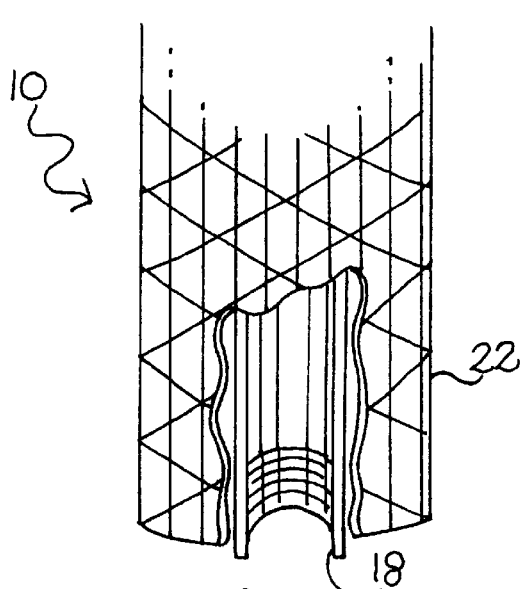
FIG. 3 is a detail view of the bottom end of the passive absorptive device of FIG. 2, with portions broken away.

Staying in FIG. 2, the top end 16 of the tube 12 extends past the termination of the bladder/batting layers 20/22, and is formed with external pipe thread. FIG. 3 shows that the bottom end 18 is formed with mating internal pipe thread which allows one passive absorptive device 10 to couple end-to-end fashion with other like passive absorptive devices 10 to form an indefinitely long train. Such a train is placed into the groundwater remediation well by inserting, serially one at a time, one passive absorptive device 10 after another. That is, the devices 10 can be lifted by hand or else be handled by help of a drilling derrick 28 (see, eg., FIG. 1). The device 10 to be inserted in the well hole is tipped up at the well head lowered in the well hole until its top end 16 is nearly flush with the well head (this is not shown). The next passive absorptive device 10 (again, this is not shown) to be coupled in the sequence is coupled to the previous one and then this next device 10 and the previous one below it are lowered in unison, and so on, until the the given train is completed.

Alternatively, a given passive absorptive device 10 in the train might be replaced by one or more plain tubes. For example, a plain tube would be comparable to what is shown by FIG. 5 except without the perforations. That way, if there is a substantially long band of strata layers in the well hole which is free from DNAPL seeps, most of such a band can be bypassed with use of more economical plain tubes.

The train is retrieved from the well hole by the reverse process. Each passive absorptive device 10 or non-operative plain segment 28 would be hoisted up and de-coupled, serially, one segment or passive absorptive device 10 at a time, until the last passive absorptive device 10 or segment has been removed and the well hole has been cleared.

Figure 4:
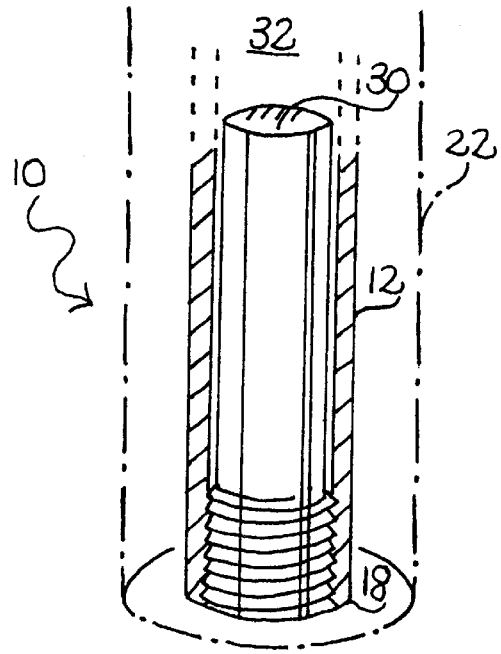
FIG. 4 is a perspective view comparable to FIG. 3 except showing a plug weight screwed into the bottom end of the passive absorptive device, portions of which device are shown in section line and other portions of which are shown in phantom line.

FIG. 4 is a perspective view of the bottom end 18 of the first segment/device 10 in the well hole. A plug weight 30 of stainless steel (or the like) is screwed into it. The plug weight 30 serves two purposes. It helps sink the train in the well hole. The plug weight 30 also plugs the lumen 32 of the core tube 12 in order to allow pressurization and/or evacuation of the lumen 32 as will be more particularly described below.

FIG. 2 shows the appearance of the outer batting and bladder 22 and 20 in a rest state, being neither inflated nor collapsed. The bladder 20 is formed with a series of longitudinal pleats 34, and the outer batting 22 is bonded to the bladder 20 (via the intermediate mat layer 26, see FIGS. 6 or 7). Thus the outer batting 22 closely conforms to the contour of pleats 34 in the bladder 20.

Figure 6:
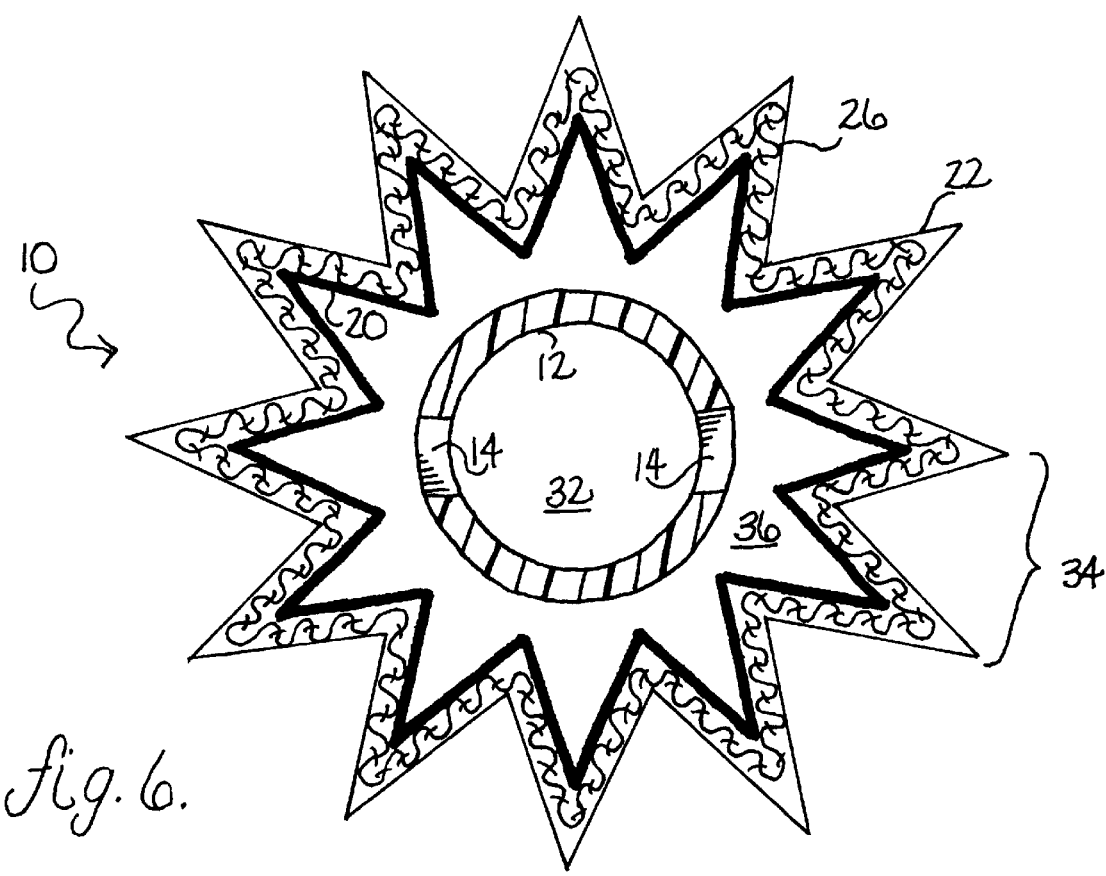
FIG. 6 is an enlarged scale section view of the FIG. 2 passive absorptive device, as taken through a horizontal cutting plane, wherein the inflatable bladder is shown relatively sucked in upon itself as occurs when subjected to vacuum (ie., negative) pressure.
Figure 7:
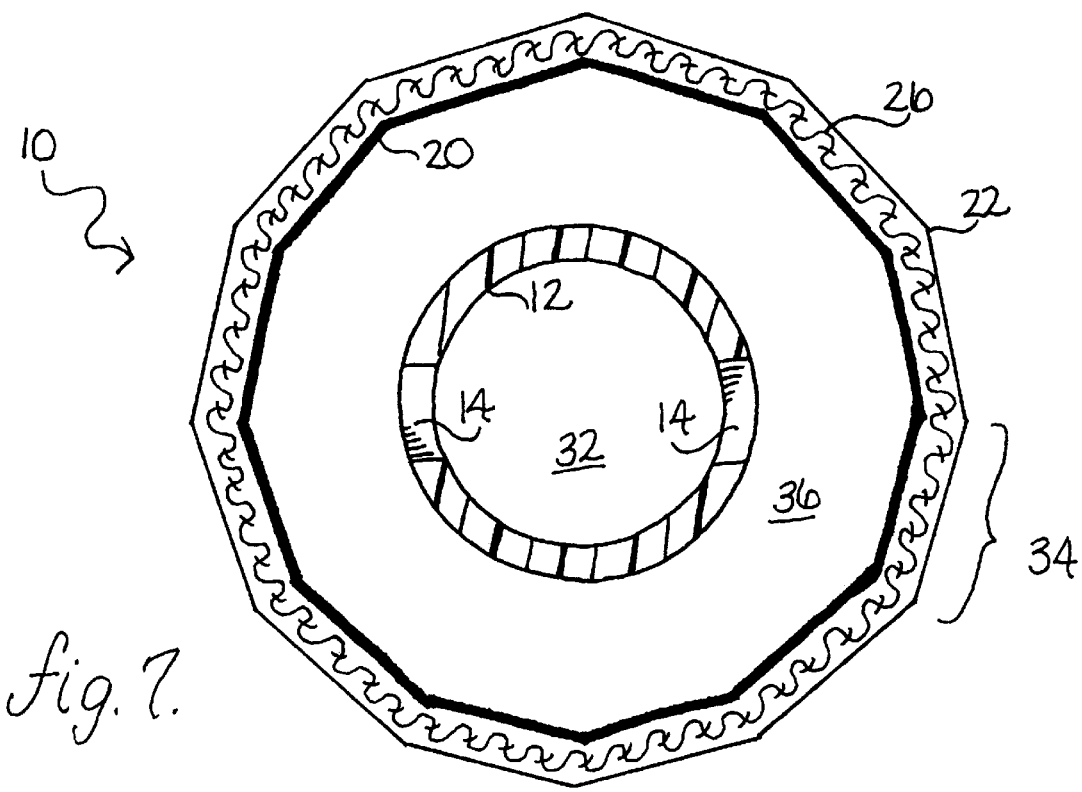
FIG. 7 is a comparable section view thereof, except showing the inflatable bladder relatively distended as occurs when subjected to positive pressure.

FIG. 6 is a view of a horizontal section cut through the passive absorptive device 10. The tube core 12 has a pair of opposed perforations 14 which allow communication between the lumen 32 of the tube 12 and a plenum 36 defined by the inflatable bladder 36. A low vacuum has been drawn on the lumen 32 and hence the bladder 20 has been partially sucked in on itself into a partially collapsed state as shown. The peaks and valleys of the pleats 34 are thus exaggerated thereby. FIG. 7 shows the reverse situation. The lumen 32 of the core tube 12 has been pressurized and this causes the bladder 20 to distend as shown, substantially in a circle. The diameter size of the distended bladder 20 preferably would be slightly larger than the diameter of the well hole it is intended to fit snugly in.

Figure 8:
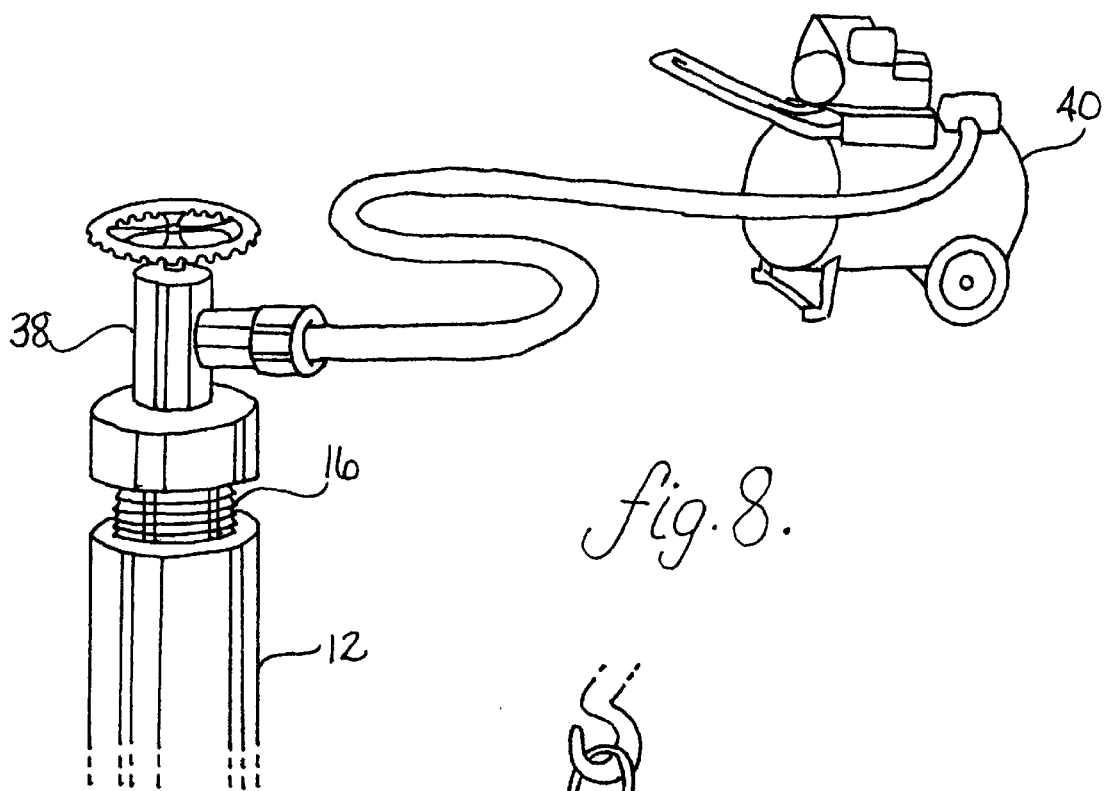
FIG. 8 is a perspective view of the passive absorptive device, with lower portions broken away, coupled to a compressor/vacuum pump; and, FIG. 9 is a perspective view showing a passive absorptive device which has been retrieved from the remediation well—presumptively after an extended lapse of time—as it is being set into a containment tub so that the DNAPL composition soaked in the DNAPL-philic hydrophobic layers thereof can be safely disposed of either on-site or elsewhere.

FIG. 8 shows one operative way of how to pressurize the lumen 32 of the core tube 12. The top nipple 16 of the core tube 12 is coupled by means of valves and piping 38 to a compressor/vacuum pump 40, which sits on the ground near the well head. Pressurizing the whole lumen 32 of the train of passive absorptive devices 10 causes the bladders 20 to swell and compress the outer batting 22 against the (inside) wall of the well hole. In reverse, drawing a vacuum on the lumen 32 of the train of passive absorptive devices 10 causes the bladders 20 to suck in on themselves and draw the batting 22 away from the wall of the well hole.

In use, the bladders 20 are inflated by the pump 40 purposely to compress the DNAPL-philic hydrophobic layer 22 against the wall of the well. It is presumed that the pump 40 will use air as the agent, although if EPA regulations would allow, other agents might be used including without limitation fresh water. The pump need only provide about ¼-atmosphere of pressure (eg., 3–4 psig). The pressure ought to be maintained on the passive absorptive devices 10 the whole time they are down in the hole, which might be months. If there are no leaks, the valve 38 on the top tube (indicated as 12,16 in FIG. 8) might just be shut off to seal in the pressure. Otherwise, the valve 38 might be left open and the pump 40 configured with an automatic pressure switch (not shown) to cycle the pump 40 ON and OFF to maintain the pressure.

Having provided a pump 40 and inflatable bladders 20, the compression of the DNAPL-philic hydrophobic material 22 flush against the well-hole wall provides the following advantages. One is, that if the DNAPL-philic hydrophobic material 22 is flush against the wall, it is better able to catch stringers of DNAPL right where they enter and not allow them to sink and escape at lower levels. Also, catching the DNAPL at the very pore it enters retards dissolution activity at the pore orifice. Hence this prevents "clotting" and/or "freezing" in the pore orifice.

After an extended lapse of time, the DNAPL-philic hydrophobic layer 22 presumably becomes "loaded" and requires retrieval for wringing or replacement. Exactly "when" to retrieve the passive absorptive device 10 is to date reckoned by routine trial and error. When it is "time" to pull out the passive absorptive device(s) 10, the compressor/vacuum pump 40 is switched over for drawing a vacuum. The vacuum need only be low (eg., again perhaps a negative ¼ atmosphere or so) to sufficiently collapse the bladders 20 in on themselves and help pull the DNAPL-philic hydrophobic material 22 away from the well-hole wall. Drawing the DNAPL-philic hydrophobic material 22 away from the well-hole wall allow better clearance in the well hole when lifting the passive absorptive devices 10 out.

Figure 9:
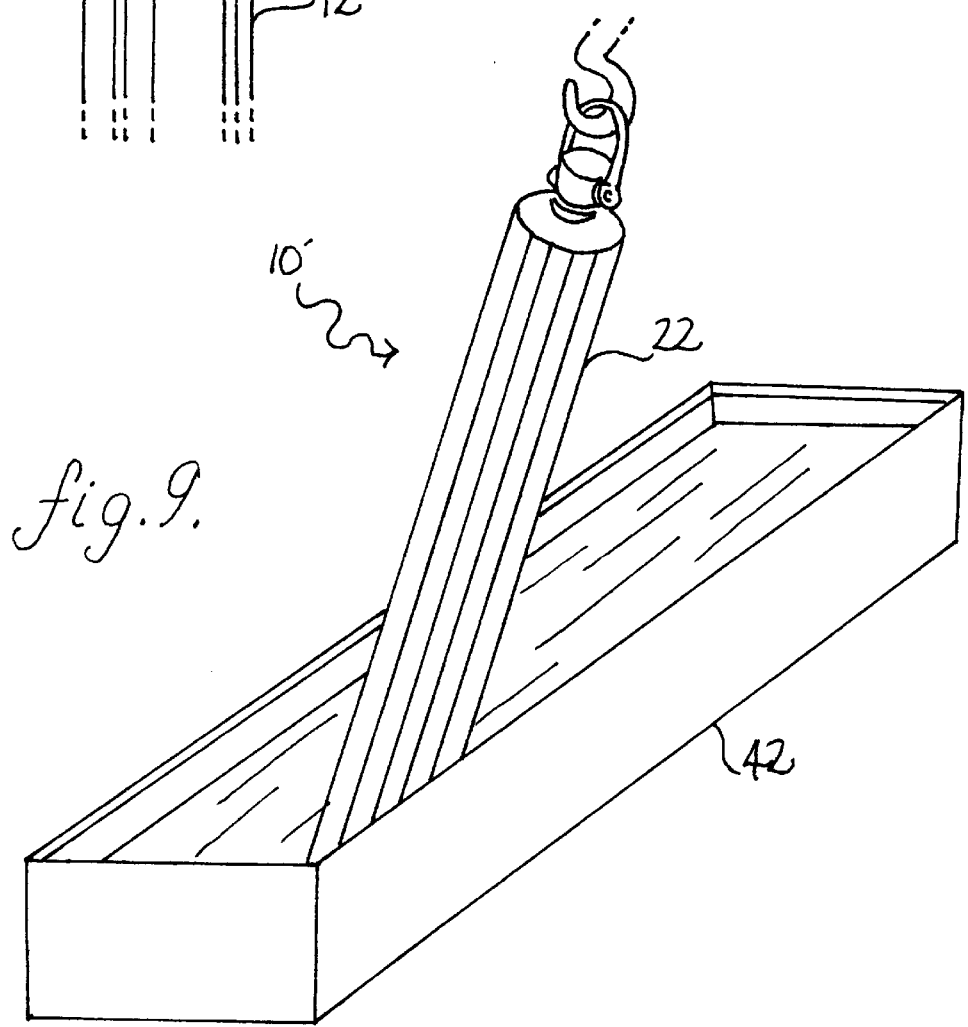

FIG. 9 shows a spent, DNAPL-soaked passive absorptive device 10' which has just been retrieved from the well hole. It is being set in a containment tub 42 so that the DNAPL composition soaked in the DNAPL-philic hydrophobic layer 22 thereof can be safely disposed of, either on-site or elsewhere. The DNAPL-philic hydrophobic layer 22 might possibly be wrung out for virtually immediate re-use. Otherwise, perhaps the entire train of spent passive absorptive devices 10' shall have to be transported to a remote service center elsewhere for cleaning and refurbishment, including re-fitting with replacement DNAPL-philic hydrophobic socks or sleeves 22 for subsequent use.

Given the foregoing, the method of passive remediation of DNAPL's in accordance with the invention is highly advantageous over "pump and treat" processes for given geologic conditions including without limitation karst geology. It is more effective at catching stringers of DNAPL entering a well hole before they sink and escape out some outlet before they reach the bottom of the well hole. The remediation method in accordance with the invention is more effective at preventing "clotting" in pore orifices. It is also economical, the passive absorptive devices are easy to fabricate, and the inventive method significantly reduces the monitoring and maintenance of the well site by service personnel relative to pump facilities which may have to run continuously for a decade or more.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of passive remediation of DNAPL'S from a groundwater remediation well, comprising the steps of:

providing a passive absorptive device having an elongated body surrounded in parts by an inflatable covering that has an outer layer of DNAPL-philic hydrophobic material;

providing inflation means for inflating the inflatable covering;

inserting the passive absorptive device in the groundwater remediation well and lowering the passive absorptive device to a given location;

inflating the inflatable covering by use of the inflation means to compress the DNAPL-philic hydrophobic layer against the wall of the groundwater remediation well;

following an extended lapse of time to allow the DNAPL-philic hydrophobic layer to soak up DNAPL seepage at the wall of the groundwater remediation well, deflating the inflatable covering to slacken the compression of the DNAPL-philic hydrophobic layer against the wall of the groundwater remediation well; and, retrieving the passive absorptive device from the groundwater remediation well so that the DNAPL soaked in the DNAPL-philic hydrophobic layer can be safely disposed of.

2. The method of claim 1 wherein the elongated body comprises an elongated tube extending between opposite ends.

3. The method of claim 2 wherein the inflatable covering comprises a resilient sleeve disposed on the outside wall of the tube.

4. The method of claim 3 wherein the outer layer of DNAPL-philic hydrophobic material comprises a sleeve-like wrap of polypropylene batting affixed to the outside wall of the resilient sleeve.

5. The method of claim 4 wherein the polypropylene batting is affixed to the outside wall of the resilient sleeve by quilting the batting to a mat which is bonded to the outside wall of the resilient sleeve.

6. The method of claim 3 wherein:

the elongated tube includes one or more perforations in the wall of the tube which allow communication between a lumen of the tube and a plenum defined by the resilient sleeve;

one end of the tube is plugged; and, the inflation means comprises a pump outside the well and suitable connections to extend between and couple the pump to the other end of the tube to allow inflation of the resilient sleeve by way of pressurizing the lumen of the tube concurrently with the plenum of the resilient sleeve.

7. The method of claim 1 wherein the step of deflating the inflatable covering further comprises drawing a suction on the resilient sleeve in order to draw the DNAPL-philic hydrophobic layer inward away from the wall of the remediation well.

8. A method of passive remediation of DNAPL'S from a groundwater remediation well, comprising the steps of:

providing a plurality of elongated segments which have ends adapted for coupling together in end-to-end fashion;

providing a plurality of elongated passive absorptive devices which have ends adapted for coupling end-to-end with each other or with the elongated segments in order to produce an indefinitely long train;

each passive absorptive device having an elongated body surrounded in parts by an inflatable covering that has an outer layer of DNAPL-philic hydrophobic material;

providing inflation means for inflating the inflatable coverings;

inserting in the groundwater remediation well, serially one at a time, selected ones of the elongated segments and passive absorptive devices, successively coupled together to produce given train thereof wherein the passive absorptive devices are disposed within the given train such the passive absorptive devices rest at chosen locations inside the well;

inflating the inflatable coverings by use of the inflation means to compress the DNAPL-philic hydrophobic layers against the wall of the groundwater remediation well;

following an extended lapse of time to allow the DNAPL-philic hydrophobic layers to soak up DNAPL seepage at the wall of the groundwater remediation well, deflating the inflatable coverings to slacken the compression of the DNAPL-philic hydrophobic layers against the wall of the groundwater remediation well; and, retrieving the given train from the groundwater remediation well, serially one segment or passive absorptive device at a time, in order to retrieve the passive absorptive devices so that the DNAPL soaked in the DNAPL-philic hydrophobic layers thereof can be safely disposed of.

9. The method of claim 8 wherein each elongated segment as well as the elongated body of each passive absorptive device comprises an elongated tube extending between opposite ends, one end of which is given a chosen couple formation and the other end of which is given a mating couple formation.

10. The method of claim 9 wherein the chosen couple formation comprises internal pipe thread and the mating couple formation comprises external pipe thread.

11. The method of claim 9 wherein the inflatable covering comprises a resilient sleeve disposed on the outside wall of the passive absorptive device's tube.

12. The method of claim 11 wherein the outer layer of DNAPL-philic hydrophobic material comprises a sleeve-like wrap of polypropylene batting affixed to the outside wall of the resilient sleeve.

13. The method of claim 12 wherein:

the wall of the tubes of the passive absorptive devices includes one or more perforations to allow communication between a lumen of the passive absorptive device's tube and a plenum defined by the resilient sleeve;

the given train includes a plug in the collective lumen thereof at an elevation below the passive absorptive device(s); and, the inflation means comprises a pump outside the well and suitable connections to the collective lumen of the given train to allow inflation of the resilient sleeve(s) by way of pressurizing the collective lumen of the given train concurrently with the plenum(s) of the resilient sleeve(s).

14. The method of claim 8 wherein the step of deflating the inflatable covering further comprises drawing a suction on the resilient sleeve in order to draw the DNAPL-philic hydrophobic layer inward away from the wall of the remediation well.

15. A method of passive remediation of DNAPL'S from a groundwater remediation well, comprising the steps of:

providing an elongated passive absorptive device arranged and sized for inserting and suspending in the groundwater remediation well, wherein the passive absorptive device has an outer layer of DNAPL-philic hydrophobic material;

providing the passive absorptive device with compressive means for selectively compressing and slackening the DNAPL-philic hydrophobic layer against and from compressing against, respectively, the wall of the groundwater remediation well;

inserting the passive absorptive device in the groundwater remediation well and lowering the passive absorptive devices to a given location;

causing the compressive means to compress the DNAPL-philic hydrophobic layer against the wall of the groundwater remediation well;

following an extended lapse of time to allow the DNAPL-philic hydrophobic layer to soak up DNAPL seepage at the wall of the groundwater remediation well, slackening the compressive means to allow the DNAPL-philic hydrophobic layer to slacken from compressing against the wall of the groundwater remediation well; and, retrieving the passive absorptive device from the groundwater remediation well so that the DNAPL soaked in the DNAPL-philic hydrophobic layer can be safely disposed of.

16. The method of claim 15 wherein the outer layer of DNAPL-philic hydrophobic material comprises a sleeve-like wrap of polypropylene batting.

17. The method of claim 15 wherein the compressive means is further configured such that the step of slackening the inflatable covering further comprises applying a withdrawing force to the DNAPL-philic hydrophobic layer to withdraw the passive absorptive device inward away from the wall of the remediation well.

18. A method of passive remediation of DNAPL'S from a groundwater remediation well, comprising the steps of:

providing a plurality of elongated segments which have ends adapted for coupling together in end-to-end fashion;

providing a plurality of elongated passive absorptive devices which have ends adapted for coupling end-to-end with each other or with the elongated segments in order to produce an indefinitely long train;

providing each passive absorptive device with compressive means for selectively compressing and slackening the DNAPL-philic hydrophobic layer against and from compressing against, respectively, the wall of the groundwater remediation well;

each passive absorptive device having an elongated body surrounded in parts by an inflatable covering that has an outer layer of DNAPL-philic hydrophobic material;

providing inflation means for inflating the inflatable coverings;

inserting in the groundwater remediation well, serially one at a time, selected ones of the elongated segments and passive absorptive devices, successively coupled together to produce given train thereof wherein the passive absorptive devices are disposed within the given train such the passive absorptive devices rest at chosen locations inside the well;

causing the compressive means to compress the DNAPL-philic hydrophobic layer against the wall of the groundwater remediation well;

following an extended lapse of time to allow the DNAPL-philic hydrophobic layers to soak up DNAPL seepage at the wall of the groundwater remediation well, slackening the compressive means to allow the DNAPL-philic hydrophobic layers to slacken from compressing against the wall of the groundwater remediation well; and, retrieving the given train from the groundwater remediation well, serially one segment or passive absorptive device at a time, in order to retrieve the passive absorptive devices so that the DNAPL soaked in the DNAPL-philic hydrophobic layers thereof can be safely disposed of.

19. The method of claim 18 wherein the outer layer of DNAPL-philic hydrophobic material comprises a sleeve-like wrap of polypropylene batting.

20. The method of claim 18 wherein the compressive means is further configured such that the step of slackening the inflatable covering further comprises applying a withdrawing force to the DNAPL-philic hydrophobic layer to withdraw the passive absorptive device inward away from the wall of the remediation well.

* * * * *